US011974012B1

(12) United States Patent
Benton et al.

(10) Patent No.: US 11,974,012 B1
(45) Date of Patent: Apr. 30, 2024

(54) MODIFYING AUDIO AND VIDEO CONTENT BASED ON USER INPUT

(71) Applicants: Kim Norton Benton, Denver, CO (US); Kimberly Ann Higgins, Woody Creek, CO (US)

(72) Inventors: Kim Norton Benton, Denver, CO (US); Kimberly Ann Higgins, Woody Creek, CO (US)

(73) Assignee: AVTech Select LLC, Denver, CO (US)

( * ) Notice: Subject to any disclaimer, the term of this patent is extended or adjusted under 35 U.S.C. 154(b) by 0 days.

(21) Appl. No.: 18/501,524

(22) Filed: Nov. 3, 2023

(51) Int. Cl.
*H04N 19/124* (2014.01)
*H04N 21/422* (2011.01)
*H04N 21/4223* (2011.01)
*H04N 21/439* (2011.01)
*H04N 21/81* (2011.01)

(52) U.S. Cl.
CPC ... *H04N 21/4394* (2013.01); *H04N 21/42203* (2013.01); *H04N 21/4223* (2013.01); *H04N 21/8106* (2013.01); *H04N 21/8153* (2013.01)

(58) Field of Classification Search
CPC .... B25J 9/1612; G06Q 30/0242; G11B 27/11; H04L 65/762; H04L 41/0896; H04L 43/0829; H04L 47/822; H04L 65/1101; H04L 65/80; H04L 67/10; H04L 67/535; H04N 7/14; H04N 19/40; H04N 21/2324; H04N 21/2393; H04N 21/42203; H04N 21/4223; H04N 21/4394; H04N 21/442; H04N 21/47205; H04N 21/8106; H04N 21/8153; H04N 21/8173; H04N 21/8549; H04N 5/91; H04N 7/181; H04N 19/124; H04N 19/167; H04N 21/23424; H04N 21/2662; H04N 21/44218; G06F 13/1668; G08B 13/19645; G10L 25/63; H03G 3/3005
See application file for complete search history.

(56) References Cited

U.S. PATENT DOCUMENTS

| | | | |
|---|---|---|---|
| 7,714,878 B2 * | 5/2010 | Gabay | H04L 65/1101 345/626 |
| 8,230,343 B2 | 7/2012 | Logan et al. | |
| 8,639,796 B2 * | 1/2014 | Covell | H04L 43/0829 709/224 |
| 8,879,895 B1 * | 11/2014 | Bussieres | H04N 5/91 386/285 |
| 8,922,659 B2 * | 12/2014 | Leny | H04N 7/181 725/105 |
| 9,197,974 B1 | 11/2015 | Clark et al. | |
| 9,454,993 B1 * | 9/2016 | Lawson | H04N 21/47205 |
| 9,716,914 B1 | 7/2017 | Mccarty et al. | |
| 9,779,554 B2 | 10/2017 | Stafford et al. | |

(Continued)

*Primary Examiner* — Gerald Gauthier
(74) *Attorney, Agent, or Firm* — Lund IP PLLC

(57) ABSTRACT

A system for managing audio and visual content in streaming video content includes a user interaction module configured to receive a user input to manage specific types of sounds and images in the streaming video content, a recognition module configured to recognize the specific types of sounds and images in the streaming video content based on the user input, and a modification module configured to provide a managed version of the streaming video content, wherein the recognized specific types of sounds and images are managed in the managed version of the streaming video content.

59 Claims, 2 Drawing Sheets

(56) References Cited

U.S. PATENT DOCUMENTS

| | | |
|---|---|---|
| 9,788,777 B1 | 10/2017 | Knight et al. |
| 9,870,798 B2 | 1/2018 | Pribula |
| 10,210,884 B2 | 2/2019 | Lyon et al. |
| 10,372,991 B1 | 8/2019 | Niemasik et al. |
| 10,440,324 B1 | 10/2019 | Lichtenberg et al. |
| 10,506,237 B1 * | 12/2019 | Liu .................... H04L 65/762 |
| 10,678,828 B2 | 6/2020 | Cramer et al. |
| 10,924,786 B2 * | 2/2021 | Huang ............. H04N 21/44218 |
| 10,951,902 B2 * | 3/2021 | Shah .................... H04N 19/167 |
| 10,990,188 B2 | 4/2021 | Selim et al. |
| 11,082,701 B2 * | 8/2021 | Liu .................... H04N 19/172 |
| 11,205,254 B2 | 12/2021 | Monkarsh |
| 11,232,686 B2 * | 1/2022 | Pettersson .......... H04N 21/2662 |
| 11,336,968 B2 | 5/2022 | Sonare et al. |
| 11,407,118 B1 * | 8/2022 | Augenbraun .......... B25J 9/1612 |
| 11,553,251 B2 | 1/2023 | Leech et al. |
| 11,582,420 B1 | 2/2023 | Lichtenberg et al. |
| 11,601,721 B2 | 3/2023 | Bloch et al. |
| 11,609,868 B1 * | 3/2023 | Ravikumar ......... G06F 13/1668 |
| 11,695,978 B2 * | 7/2023 | Dahl .................... H04L 65/80 |
| | | 709/231 |
| 11,748,055 B2 * | 9/2023 | Cremer ................ H03G 3/3005 |
| | | 381/107 |
| 2003/0037335 A1 * | 2/2003 | Gatto .................... H04N 19/40 |
| | | 348/E7.071 |
| 2006/0056802 A1 * | 3/2006 | Seo ...................... G11B 27/11 |
| | | 386/E5.064 |
| 2009/0310939 A1 * | 12/2009 | Basson .................. G10L 25/63 |
| | | 704/E17.001 |
| 2010/0125353 A1 * | 5/2010 | Petit-Huguenin ....... H04L 67/10 |
| | | 709/236 |
| 2011/0035034 A1 * | 2/2011 | Gupta .................. G06Q 30/0242 |
| | | 709/233 |
| 2012/0030699 A1 | 2/2012 | Amin |
| 2012/0159530 A1 | 6/2012 | Ahrens et al. |
| 2014/0013228 A1 * | 1/2014 | Hutten ............. H04N 21/23424 |
| | | 715/720 |
| 2014/0043424 A1 * | 2/2014 | Gava ........................ H04N 7/14 |
| | | 348/E7.078 |
| 2014/0229604 A1 * | 8/2014 | Pfeffer .................. H04L 47/822 |
| | | 709/224 |
| 2014/0358520 A1 | 12/2014 | Davey |
| 2015/0070516 A1 | 3/2015 | Shoemake et al. |
| 2015/0201198 A1 * | 7/2015 | Marlatt ................ H04N 19/124 |
| | | 375/240.03 |
| 2015/0215586 A1 * | 7/2015 | Lasko ............. G08B 13/19645 |
| | | 348/143 |
| 2015/0341570 A1 * | 11/2015 | Jaynes .................. H04L 67/535 |
| | | 709/227 |
| 2016/0037217 A1 | 2/2016 | Harmon et al. |
| 2016/0073138 A1 * | 3/2016 | Francisco .......... H04N 21/2393 |
| | | 725/28 |
| 2016/0285724 A1 * | 9/2016 | Lundquist ........... H04L 41/0896 |
| 2017/0264920 A1 | 9/2017 | Mickelsen et al. |
| 2017/0289624 A1 | 10/2017 | Avila et al. |
| 2017/0295215 A1 | 10/2017 | Syed |
| 2018/0091856 A1 | 3/2018 | Ayers et al. |
| 2018/0349502 A1 | 12/2018 | Maycock |
| 2018/0359477 A1 | 12/2018 | Yang |
| 2018/0376205 A1 | 12/2018 | Oswal et al. |
| 2019/0052471 A1 | 2/2019 | Panattoni et al. |
| 2019/0130189 A1 | 5/2019 | Zhou et al. |
| 2019/0306563 A1 * | 10/2019 | Chen .................... H04N 21/442 |
| 2020/0077150 A1 | 3/2020 | Fox et al. |
| 2020/0092610 A1 | 3/2020 | Baughman et al. |
| 2022/0007075 A1 | 1/2022 | Richter |
| 2022/0038402 A1 | 2/2022 | Yang et al. |
| 2022/0408131 A1 | 12/2022 | Gardner |
| 2023/0076702 A1 * | 3/2023 | Bloch ................ H04N 21/8173 |
| 2023/0115250 A1 * | 4/2023 | Scallon ............. H04N 21/8549 |
| | | 715/204 |

\* cited by examiner

MODIFYING AUDIO AND VIDEO CONTENT BASED ON USER INPUT

TECHNICAL FIELD

The disclosure is related to techniques for modifying audio and video content.

BACKGROUND OF THE INVENTION

The advent of digital technology has revolutionized the way we consume media. In particular, the proliferation of streaming video content has provided users with unprecedented access to a vast array of multimedia content. This content ranges from movies and television shows to live broadcasts and user-generated videos. As the technology has evolved, so too have the tools and techniques for manipulating and customizing this content to suit individual user preferences.

SUMMARY OF THE INVENTION

This disclosure includes techniques for modifying specific types of sounds and images in streaming video content in response to a user input. For example, a user may request modification or elimination of sounds and images, such as animal sounds or images of violence, which may cause distress or disturbance to the user.

In one example, a system for managing audio and visual content in streaming video content includes a user interaction module configured to receive a user input to manage specific types of sounds and images in the streaming video content, a recognition module configured to recognize the specific types of sounds and images in the streaming video content based on the user input, and a modification module configured to provide a managed version of the streaming video content, wherein the recognized specific types of sounds and images are managed in the managed version of the streaming video content.

In another example, this disclosure is directed towards a non-transitory computer-readable medium storing instructions that, when executed by a processor, cause the processor to perform a method for managing audio and visual content in streaming video content, the method comprising: receiving a user input to manage specific types of sounds and images in the streaming video content, recognizing the specific types of sounds and images in the streaming video content based on the user input, and providing a managed version of the streaming video content, wherein the recognized specific types of sounds and images are managed in the managed version of the streaming video content.

DETAILED DESCRIPTION OF THE INVENTION

This disclosure includes techniques for modifying specific types of sounds and images in streaming video content in response to a user input. For example, a user may request modification or elimination of sounds and images, such as animal sounds or images of violence, which may cause distress or disturbance to the user.

The disclosed techniques allow a user to customize the audio and visual content of the video based on their personal preferences and requirements. This customization is achieved by managing specific types of sounds and images in the video content, particularly those that some users may find disruptive, annoying, or distressing.

Figure 1:
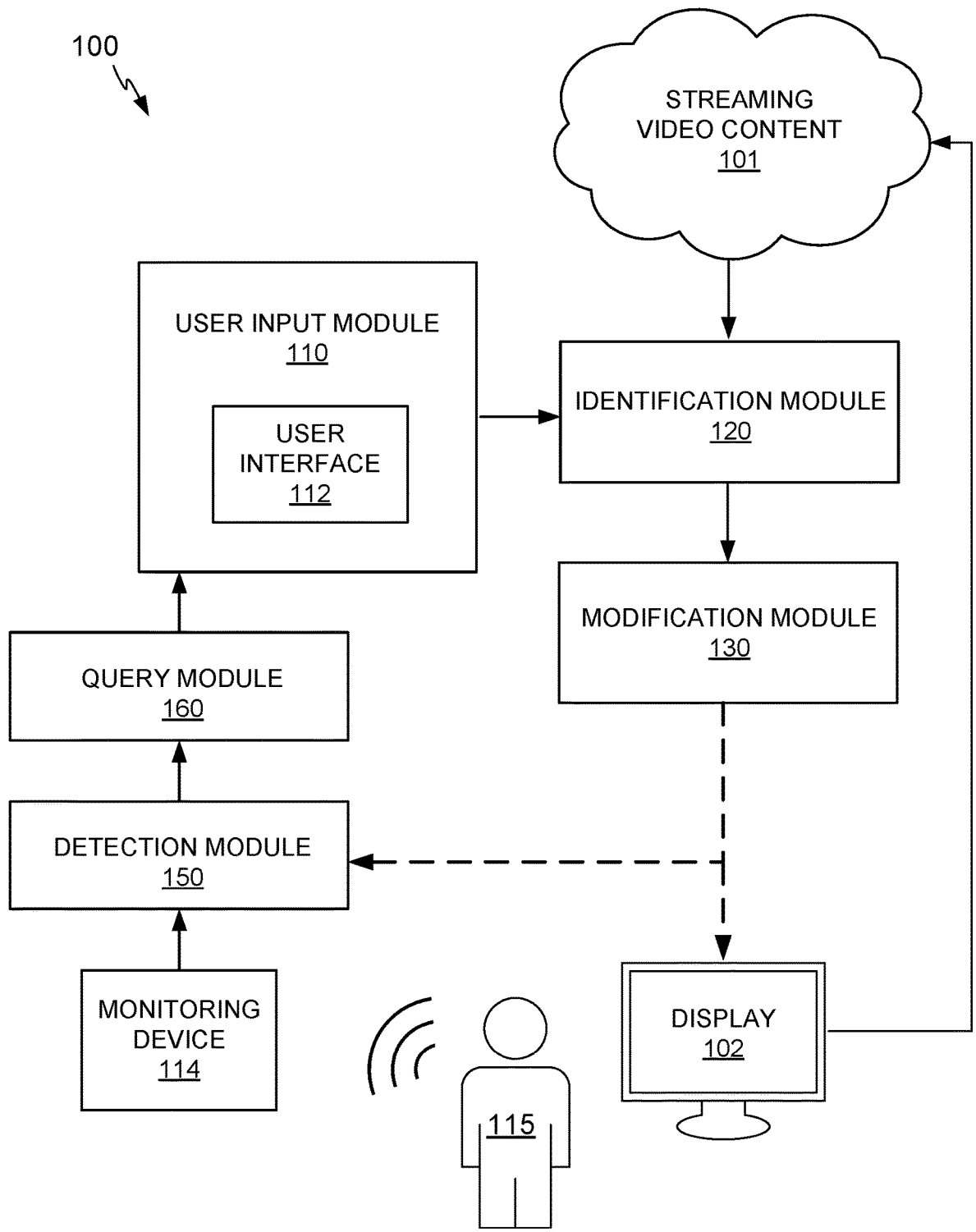
FIG. 1 is a conceptual illustration of a system for modifying specific types of sounds and images in streaming video content in response to a user input.

FIG. 1 is a conceptual illustration of a system 100 for modifying specific types of sounds and images in streaming video content 101 in response to a user input. For instance, the system 100 can manage animal sounds in the video content. Animal sounds, such as the barking of dogs or the chirping of birds, can potentially excite pets, wake sleeping children, or cause stress to individuals who may find these sounds disturbing. By providing the option to manage these sounds, the system 100 allows users to enjoy the video content without being disturbed by such sounds.

Similarly, the system 100 can also manage images in the video content. Certain images, such as images of violence or guns, can potentially cause distress or disturbance to viewers of the content. By providing the option to manage these images, the system 100 allows users to enjoy the video content without being subjected to such images.

The system 100 provides a personalized and responsive viewing experience. Whether it's managing animal sounds, war sounds, gunshots, images of animals, war scenes, violence, or guns, the system 100 provides users with the flexibility to customize their viewing experience, making the viewing of streaming video content 101 a more enjoyable and personalized experience.

User Input Module 110

The user input module 110 is configured to receive a user input from user interface 112 to manage specific types of sounds and images in the streaming video content 101. The user input can include a selection of specified sounds and images to be managed, and specific levels of management for the sounds and images. For instance, a user may choose to completely suppress the sounds of dogs barking, or to reduce the volume of bird chirping by a specific percentage. This flexibility allows the user to customize their viewing experience according to their personal preferences and requirements.

The user input module 110 can receive user input through a user interface 112 implemented on a variety of devices. These devices can include, but are not limited to, computer devices, mobile devices, and smart televisions. For instance, a user may input their preferences through a touch screen interface on a mobile device or tablet, a voice recognition system on a smart speaker or virtual assistant, a graphical user interface (GUI) on a computer or smart TV, or a physical control panel on a device such as a mixer or soundboard.

User Interface 112

The user interaction module of the system 100 is designed to receive user input through a user interface 112. This user interface 112 serves as the primary point of interaction between the user and the system 100, enabling the user to specify their preferences for the management of sounds and images in the streaming video content 101. The user interface 112 can include various interactive elements, such as drop-down menus, sliders, checkboxes, or text input fields, that allow the user to specify their preferences. It can also provide visual feedback, such as a preview of the managed sounds or a visual representation of the selected images, to assist the user in making their selection.

The user interface 112 can be implemented on a variety of devices, each offering different capabilities and user experiences. These devices can include, but are not limited to, computer devices, mobile devices, smart televisions, virtual reality devices, augmented reality devices, gaming consoles, wearable devices, home automation systems, and vehicle infotainment systems. For instance, a user may input their preferences through a touch screen interface on a mobile device or tablet, a voice recognition system on a smart speaker or virtual assistant, a graphical user interface (GUI) on a computer or smart TV, or a physical control panel on a device such as a mixer or soundboard. The user interface 112 is designed to be compatible with a wide range of devices, providing users with the flexibility to input their preferences through the device that is the easiest and the convenient for them.

Furthermore, the user interface 112 can provide users with the option to save their preferences, allowing them to apply the same settings to future streaming video content 101 without having to input their preferences each time.

Identification Module 120

The identification module 120 is configured to recognize the specific types of sounds and images in the streaming video content 101 based on the user input. The identification module 120 uses various techniques to analyze the audio and visual content of the video and detect the presence of the specified sounds and images. These techniques can include spectral analysis, machine learning algorithms, pattern recognition techniques, audio fingerprinting, and deep learning techniques.

Spectral analysis involves examining the frequency spectrum of the audio signal to identify specific types of sounds. Each animal sound has a distinct frequency spectrum, which can be compared with a library of frequency spectra of known animal sounds. This comparison allows the identification module 120 to accurately identify the presence of specific types of animal sounds in the streaming video content 101.

Machine learning algorithms can be trained on a dataset of animal sounds, enabling them to recognize similar sounds in the streaming video content 101. These algorithms can include supervised learning algorithms, such as support vector machines or neural networks, which are capable of learning complex patterns in the audio data and accurately identifying animal sounds.

Pattern recognition techniques involve comparing the audio content of the streaming video with a library of animal sounds to find matches. By comparing the pattern of the audio signal with a library of patterns of known animal sounds, the identification module 120 can accurately identify the presence of specific types of animal sounds in the streaming video content 101.

Audio fingerprinting is a technique that involves creating a condensed digital summary, or "fingerprint," of an audio signal. This fingerprint can then be compared with a database of fingerprints of known animal sounds. If the fingerprint of the audio signal matches the fingerprint of a known animal sound in the database, the identification module 120 can identify the presence of that animal sound in the streaming video content 101.

Deep learning techniques, such as convolutional neural networks (CNNs), can be used to identify animal sounds in streaming video content 101. CNNs are particularly effective at identifying patterns in audio data, making them well-suited for the task of identifying animal sounds. By training a CNN on a dataset of animal sounds, the identification module 120 can learn to recognize the distinct features of each animal sound and accurately identify these sounds in the streaming video content 101.

Through the use of these techniques, the identification module 120 can accurately recognize specific types of sounds and images in the streaming video content 101 based on the user input. This recognition serves as a foundation for the subsequent management process, enabling the system 100 to manage the desired sounds and images in the streaming video content 101.

Modification Module 130

The modification module 130 is specifically designed to provide a managed version of the streaming video content 101, wherein the recognized specific types of sounds and images are managed as per the user input. Specifically, the modification module 130 alters the desired sounds and images in the streaming video content 101. The modification module 130 may apply any number of techniques to modify audio signals. These techniques include volume attenuation, noise cancellation, audio synthesis, pitch shifting, and time stretching. These techniques can also include suppression, replacement, and distortion of the sounds and images.

Volume attenuation is a process of reducing the intensity of an audio signal. It is often used in audio mixing and sound engineering to balance the levels of different audio sources. Volume attenuation can be used to decrease the loudness of specific sounds in the streaming video content, such as animal sounds or loud noises, based on user preferences.

Time stretching is a digital audio processing technique that allows the duration of an audio signal to be changed without affecting its pitch. This is achieved by altering the speed or tempo of the audio signal without changing its spectral characteristics. Time stretching is one of the techniques or algorithms that can be used to modify identified sounds in streaming video content. For instance, if a specific animal sound or a loud noise is identified in the video content, time stretching can be used to lengthen or shorten the duration of this sound in the modified version of the content. This can help to reduce the disruptive impact of the sound on the viewer, enhancing their viewing experience.

Noise Cancellation: This is a method used to reduce unwanted sounds by creating an "anti-noise" sound wave that interferes with the unwanted noise, effectively cancelling it out. Active noise cancellation is commonly used in headphones to reduce background noise.

Audio Synthesis: This is the electronic production of sound. It can involve creating new sounds or altering existing ones. Synthesizers, which can generate a wide range of sounds, are commonly used for audio synthesis. Audio synthesis can be used to create alternative sounds to replace specific types of sounds in the streaming video content, such as animal sounds or loud noises.

Pitch Shifting: This is a sound recording technique where the original pitch of a sound is raised or lowered. Effects units that utilize pitch shifting can transpose an audio signal up or down in pitch. Pitch shifting can be used to alter the pitch of specific sounds in the streaming video content, changing the way they are perceived by the viewer.

Suppression involves reducing the amplitude of the audio signal corresponding to the recognized sounds. This effectively lowers the volume of these sounds in the streaming video content 101, making them less noticeable or completely inaudible, depending on the degree of suppression applied. This technique can be particularly useful for users who wish to suppress the sounds of specific animals without completely removing them from the audio content.

Replacement involves generating a new audio signal or visual content to replace the recognized sounds or images.

For instance, the sounds of dogs barking could be replaced with the sounds of birds chirping, or the images of violence could be replaced with more peaceful scenes. The new audio signals or visual content can be selected from a library of sounds and images, or they can be synthesized on the fly using sound synthesis algorithms or image generation techniques. This technique can be particularly useful for users who wish to replace the sounds or images of specific elements with more pleasant or less disturbing sounds or images.

Distortion involves changing the characteristics of the audio signal or visual content corresponding to the recognized sounds or images. This alters the quality of these sounds or images, making them sound or look different from their original form. This can be particularly useful for users who find the original quality of these sounds or images disturbing or annoying. The degree of distortion can be adjusted based on the user's preferences, allowing them to customize the quality of the sounds or images to their liking.

System 100 Hardware Examples

The system 100 can be hosted on various types of systems, including, but not limited to, a cloud-based system, a local device system, a distributed network system, a peer-to-peer network system, an edge computing system, and a hybrid cloud-edge system. With any of these systems, the disclosed techniques may be embodied in a non-transitory computer-readable medium storing instructions that, when executed by one or more processors, cause the processors to perform a method for managing audio and visual content.

Cloud-Based System

In a cloud-based system, the user interaction module, the recognition module, and the modification module 130 are hosted on a cloud computing platform. The user inputs are received and processed in the cloud, and the managed streaming video content 101 is streamed back to the user's device over the internet. This system allows for remote access and management of the streaming video content 101, and can scale to handle large volumes of video content and user inputs. However, it may require a stable and high-speed internet connection, and there may be concerns about data privacy and security in the cloud.

Local Device System

In a local device system, the user interaction module, the recognition module, and the modification module 130 are hosted on the user's device, such as a computer, mobile device, or smart TV. The user inputs are received and processed on the device, and the managed streaming video content 101 is streamed directly on the device. This system allows for real-time management of the streaming video content 101, and can provide a more personalized user experience. However, it may require more computational resources on the device, and the system 100's performance may be limited by the device's capabilities.

Distributed Network System

In a distributed network system, the user interaction module, the recognition module, and the modification module 130 are hosted on a network of servers. The user inputs are received and processed on the server that is closest to the user, and the managed streaming video content 101 is streamed back to the user's device over the network. This system allows for handling of user inputs and streaming video content 101, and can provide a high-quality streaming experience for the user. However, it may require a complex network infrastructure, and there may be concerns about data privacy and security in the network.

Peer-to-Peer Network System

In a peer-to-peer network system, the user interaction module, the recognition module, and the modification module 130 are distributed across a network of user devices. Each device contributes its resources to the network, processing user inputs and streaming video content 101 in a decentralized manner. This system can provide high resilience and scalability, as the failure or overload of one device does not affect the overall performance of the system 100. However, it may require a robust network protocol, and the system 100's performance may be affected by the capabilities and availability of the user devices in the network.

Edge Computing System

In an edge computing system, the user interaction module, the recognition module, and the modification module 130 are hosted on edge devices located close to the user's location. These edge devices can be routers, gateways, or other network devices that provide low latency access to the user. The user inputs are processed at the edge of the network, allowing for real-time management of the streaming video content 101. The managed content is then streamed directly to the user's device, reducing the latency and bandwidth usage.

Hybrid Cloud-Edge System

In a hybrid cloud-edge system, some components of the system 100 are hosted on a cloud platform while others are hosted on edge devices. For instance, the user interaction module and modification module 130 could be hosted on the cloud for global accessibility and scalability, while the recognition module could be hosted on edge devices for real-time processing. This system combines the benefits of cloud and edge computing, providing a balance between scalability, latency, and bandwidth usage.

Image Filtering

In addition to the techniques for managing specific types of sounds in streaming video content 101, system 100 may also managing images of animals in video content. Some users may find images of specific animals to be disturbing or distracting. For instance, a user may have a phobia of spiders and may wish to avoid seeing images of spiders in video content. In such cases, the system 100 can analyze the video content to detect the presence of images of specific animals based on user input, and then provide a managed version of the content where these images are blurred, obscured, or replaced with other images. This feature can enhance the user experience, allowing users to enjoy the video content without being subjected to objectionable images.

Another variation of these techniques includes managing war scenes in video content. War scenes can be distressing for some users, causing fear, exacerbating post-traumatic stress disorder (PTSD), or simply being too violent or graphic for some viewers. In such cases, the system 100 can analyze the video content to detect the presence of war scenes based on user input, and then provide a managed version of the content where these scenes are blurred, obscured, or replaced with other scenes. This feature can enhance the user experience, allowing users to enjoy the video content without being subjected to distressing scenes.

A further variation of these techniques includes managing images of violence or guns in video content. Images of violence or guns can be disturbing for some users, particularly those who are sensitive to such content or those who are watching the content with young children. In such cases, the system 100 can analyze the video content to detect the presence of images of violence or guns based on user input, and then provide a managed version of the content where these images are blurred, obscured, or replaced with other images. This feature can enhance the user experience, allowing users to enjoy the video content without being subjected to disturbing images.

In all these variations, the system 100 may employs any of a variety of techniques to analyze the video content and detect the presence of specific types of images. These techniques can include image recognition techniques, machine learning algorithms, pattern recognition techniques, and deep learning techniques. Once the specific types of images have been detected, the modification module 130 modifies these images using various techniques, such as image blurring, image obscuring, or image replacement. The modified images are then combined with the original audio content or managed audio content of the video to provide a managed version of the video content that caters to the user's preferences and requirements.

Monitoring Device 114

In a variation of the techniques, system 100 may further include a monitoring device 114 to observe reactions to the video content. Monitoring device 114 may include a camera or a microphone, for example. The monitoring device 114 is strategically configured to observe the users and the surrounding noise, thereby providing a comprehensive understanding of the user's environment and reactions to the streaming video content 101.

When a camera is employed as the monitoring device 114, it captures visual data that can be analyzed to detect user 115 responses to the streaming video content 101. For instance, the camera may capture the physical reactions of a pet in response to animal sounds in the video content. Similarly, the camera can also capture visual cues of human stress, such as facial expressions or body language, in response to loud noises in the video content. The visual data captured by the camera provides a rich source of information that can be analyzed by the detection module 150 to identify specific responses to the audio and/or video elements in the streaming video content 101.

On the other hand, when a microphone is used as the monitoring device 114, it records the surrounding noise and audio responses from the user or pets. For example, the microphone can detect a dog barking in response to animal sounds in the video content or a baby crying in response to loud noises. The audio data captured by the microphone provides a direct measure of the user's or pet's reactions to the streaming video content 101, which can be analyzed by the detection module 150 to identify specific responses.

The monitoring device 114 is configured to continuously capture data while the streaming video content 101 is being consumed. This continuous monitoring allows for real-time detection of ambient response, thereby enabling the system 100 to promptly react to any potentially disruptive elements in the video content. The data collected by the monitoring device 114 is then relayed to the detection module 150 for further analysis.

Detection Module 150

The detection module 150 is designed to analyze the data received from the monitoring device 114 and detect specific responses to the audio and/or video elements in the streaming video content 101. The detection module 150 is configured to identify a range of responses, from signs of human stress to indications of excited animals.

The detection module 150 is configured to recognize specific sound patterns or visual cues associated with various responses. For instance, the detection module 150 may use sound pattern recognition techniques to identify a dog's bark or a baby's cry. Similarly, it may use visual cue recognition techniques to identify signs of human stress or excitement in response to the video content. These techniques ensure that the detection module 150 accurately identifies responses, thereby enabling the system 100 to react accordingly.

The detection module 150 operates in real-time, analyzing the data received from the monitoring device 114 as it is captured. This real-time operation allows the system 100 to promptly detect ambient responses and react accordingly, thereby enhancing the user's viewing experience. Once a response is detected, the detection module 150 communicates with the query module 160, initiating the next step in the system 100's process of managing content in streaming video.

The interaction between the detection module 150 and the other components of the system 100 is facilitated through a communication protocol. This protocol ensures that the detection of a response by the detection module 150 is communicated to the query module 160. The seamless interaction between these components is integral to the system 100's ability to effectively manage content in streaming video, thereby enhancing the user's viewing experience.

Query Module 160

The query module 160 is activated when the detection module 150 identifies a response to video content presented on display 102. The primary function of the query module 160 is to interact with the user upon the detection of a response, providing the user with the option to manage the content in the streaming video content 101.

The query module 160 is configured to ask the user whether they would like to manage the content in the streaming video content 101. This interaction is designed to provide the user with control over the content they consume, allowing them to filter out potentially disruptive elements. For instance, if the system 100 detects a dog barking in response to animal sounds in the video content, the query module 160 can interact with the user, asking them if they would like to manage the content. This could involve filtering out the animal sounds that caused the dog's response.

Similarly, if the system 100 detects a baby crying in response to loud noises in the video content, the query module 160 can interact with the user, asking them if they would like to manage the content. This could involve filtering out the loud noises that caused the baby's response. This interaction is designed to provide the user with control over the content they consume, allowing them to filter out potentially disruptive elements.

The interaction between the query module 160 and the user can take various forms, depending on the user's preferences and the nature of the detected ambient response. For example, the query module 160 could present the user with a pop-up message on their screen, asking them if they would like to manage the content. Alternatively, the query module 160 could send the user a notification on their mobile device, asking them the same question. The specific form of interaction can be customized based on the user's preferences, thereby enhancing the user's control over the content they consume.

In summary, the query module 160 interacts with the user upon the detection of a response. By asking the user whether they would like to manage the content in the streaming video content 101, the query module 160 provides the user with control over the content they consume, allowing them to filter out potentially disruptive elements. This interaction enhances the user's viewing experience, making the viewing of streaming video content 101 a more enjoyable and personalized experience.

The system 100 is designed to manage a variety of audio and visual elements within the streaming video content 101. This includes, but is not limited to, animal sounds and loud noises such as gunfire, fights, or arguments. The system's ability to manage these types of content is integral to its purpose of enhancing the user's viewing experience.

Animal sounds in the video content, for instance, can cause excitement or stress in pets. The system 100 is designed to identify these sounds and manage them based on the user's preferences and the detected ambient responses. For example, if a dog barks in response to animal sounds in the video content, the system 100 can filter out these sounds, thereby preventing further excitement or stress in the pet. The detection module is configured to recognizing specific sound patterns associated with various animal sounds observed by monitoring device 114.

Loud noises in the video content, such as gunfire, fights, or arguments, can also cause stress in humans, particularly in young children. The system 100 is designed to identify these noises and manage them based on the user's preferences and the detected ambient responses. For instance, if a baby cries in response to loud noises in the video content, the system 100 can filter out these noises, thereby preventing further stress in the baby. The detection module 150 is configured distinguishing these noises from other sounds in the video content.

The system 100 may be designed to operate in real-time, allowing for prompt reaction to potentially disruptive elements in the video content. This real-time operation is facilitated by the seamless interaction between the system 100's components, particularly the monitoring device 114, the detection module 150, and the query module 160. The monitoring device 114 captures the audio and visual data, the detection module 150 analyzes this data and detects specific responses, and the query module 160 interacts with the user, providing them with the option to manage the content. This cohesive operation of the system 100's components enables effective management of content in streaming video, thereby enhancing the user's viewing experience.

In the same or different examples, the system 100 could be configured to automatically manage the content based on the detected ambient responses, without querying the user. For example, if the system 100 detects a dog barking in response to animal sounds in the video content, it could automatically filter out these sounds, thereby preventing further excitement or stress in the pet. This automatic content management could enhance the system 100's responsiveness to potentially disruptive elements in the video content, thereby enhancing the user's viewing experience.

Figure 2:
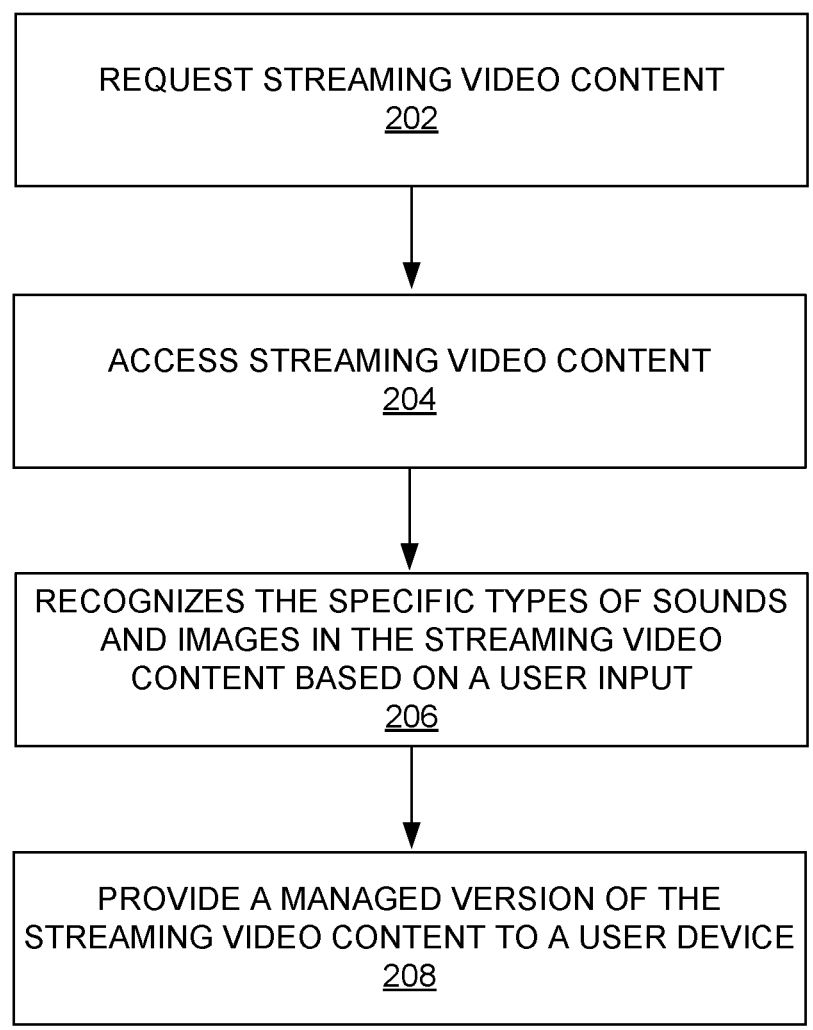
FIG. 2 is a flowchart illustrating example techniques for modifying specific types of sounds and images in streaming video content in response to a user input.

FIG. 2 is a flowchart 200 illustrating example techniques for modifying specific types of sounds and images in streaming video content in response to a user input. For clarity, the techniques of FIG. 2 are described with respect to system 100 (FIG. 1).

First, a user device, such as display 102 issues a request to access video content, such as streaming video content 101 (step 202). In response to the request, identification module 120 accesses the video content (step 204). Based on a user input from user input module 110, identification module 120 recognizes the specific types of sounds and images in the streaming video content based on the user input. (step 206). Modification module 130, provides a managed version of the streaming video content to the user device (step 208). The managed version of the streaming video content includes altered content such that specific types of sounds and images are managed in the managed version of the streaming video content.

The specific techniques for modifying specific types of sounds and images in streaming video content in response to a user input, such as techniques embodied by system 100 are merely illustrative of the general inventive concepts included in this disclosure as defined by the following claims.

What is claimed is:

1. A system for managing audio and visual content in streaming video content, the system comprising:
   a user interaction module configured to receive a user input to manage specific types of sounds and images in the streaming video content;
   a recognition module configured to recognize the specific types of sounds and images in the streaming video content based on the user input; and
   a modification module configured to provide a managed version of the streaming video content, wherein the recognized specific types of sounds and images are managed in the managed version of the streaming video content,
   wherein the management of the recognized sounds and images is achieved through techniques selected from a group consisting of:
   volume attenuation;
   noise cancellation;
   audio synthesis;
   pitch shifting; and
   time stretching.

2. The system of claim 1, wherein the user input includes a selection of specified sounds and images to be managed in the streaming video content.

3. The system of claim 1, wherein the user input includes a selection of specific levels of management for the sounds and images.

4. The system of claim 1, further comprising an analysis module configured to analyze the streaming video content to detect the specific types of sounds and images.

5. The system of claim 1, further comprising a filtering module configured to filter other elements of a video signal based on a user selection.

6. The system of claim 1, wherein the user interaction module, the recognition module, and the modification module are hosted on a cloud computing system, allowing for remote access and management of the streaming video content.

7. The system of claim 1, wherein the management of the recognized sounds and images includes the volume attenuation.

8. The system of claim 1, wherein the management of the recognized sounds and images includes the noise cancellation.

9. The system of claim 1, wherein the management of the recognized sounds and images includes the audio synthesis.

10. The system of claim 1, wherein the management of the recognized sounds and images includes the pitch shifting.

11. The system of claim 1, wherein the management of the recognized sounds and images includes the time stretching.

12. A system for managing audio and visual content in streaming video content, the system comprising:
   a user interaction module configured to receive a user input to manage specific types of sounds and images in the streaming video content;

a recognition module configured to recognize the specific types of sounds and images in the streaming video content based on the user input; and a modification module configured to provide a managed version of the streaming video content, wherein the recognized specific types of sounds and images are managed in the managed version of the streaming video content, wherein the user input is received through a user interface on a device selected from a group consisting of:

a computer device;

a mobile device;

a smart television;

a virtual reality device;

an augmented reality device;

a gaming console;

a wearable device;

a home automation system; and a vehicle infotainment system.

13. The system of claim 12, wherein the device is the computer device.

14. The system of claim 12, wherein the device is the mobile device.

15. The system of claim 12, wherein the device is the smart television.

16. The system of claim 12, wherein the device is the virtual reality device.

17. The system of claim 12, wherein the device is the augmented reality device.

18. The system of claim 12, wherein the device is the gaming console.

19. The system of claim 12, wherein the device is the wearable device.

20. The system of claim 12, wherein the device is the home automation system.

21. The system of claim 12, wherein the device is the vehicle infotainment system.

22. The system of claim 12, wherein providing the managed version of the streaming video content includes blurring the specific types of images.

23. The system of claim 12, wherein providing the managed version of the streaming video content includes obscuring the specific types of images.

24. The system of claim 12, wherein providing the managed version of the streaming video content includes replacement of the specific types of images with new visual content.

25. A system for managing audio and visual content in streaming video content, the system comprising:

a user interaction module configured to receive a user input to manage specific types of sounds and images in the streaming video content;

a recognition module configured to recognize the specific types of sounds and images in the streaming video content based on the user input; and a modification module configured to provide a managed version of the streaming video content, wherein the recognized specific types of sounds and images are managed in the managed version of the streaming video content, wherein the recognition of sounds and images in the streaming video content is achieved through techniques selected from a group consisting of spectral analysis, machine learning algorithms, pattern recognition techniques, audio fingerprinting, and deep learning techniques.

26. The system of claim 25, wherein the recognition of sounds and images in the streaming video content includes the spectral analysis.

27. The system of claim 25, wherein the recognition of sounds and images in the streaming video content includes the machine learning algorithms.

28. The system of claim 25, wherein the recognition of sounds and images in the streaming video content includes the pattern recognition techniques.

29. The system of claim 25, wherein the recognition of sounds and images in the streaming video content includes the audio fingerprinting.

30. The system of claim 25, wherein the recognition of sounds and images in the streaming video content includes the deep learning techniques.

31. The system of claim 25, wherein providing the managed version of the streaming video content includes blurring the specific types of images.

32. The system of claim 25, wherein providing the managed version of the streaming video content includes obscuring the specific types of images.

33. The system of claim 25, wherein providing the managed version of the streaming video content includes replacement of the specific types of images with new visual content.

34. A system for managing audio and visual content in streaming video content, the system comprising:

a monitoring device configured to monitor users and noise;

a detection module configured to detect ambient responses to the streaming video content;

a query module configured to query the user whether they would like to manage content in the streaming video content in response to the detection of ambient response;

a user interaction module configured to receive a user input to manage specific types of sounds and images in the streaming video content;

a recognition module configured to recognize the specific types of sounds and images in the streaming video content based on the user input; and a modification module configured to provide a managed version of the streaming video content, wherein the recognized specific types of sounds and images are managed in the managed version of the streaming video content.

35. The system of claim 34, wherein the monitoring device is selected from a group consisting of a camera and a microphone.

36. The system of claim 34, wherein the responses are selected from a group consisting of human stress and excited animals.

37. The system of claim 34, wherein the detection module is further configured to detect a dog barking in response to animal sounds in the streaming video content.

38. The system of claim 34, wherein the detection module is further configured to detect a baby crying in response to loud noises in the streaming video content.

39. A non-transitory computer-readable medium storing instructions that, when executed by a one or more processors, cause the processors to perform a method for managing audio and visual content in streaming video content, the method comprising:

receiving a user input to manage specific types of sounds and images in the streaming video content;

recognizing the specific types of sounds and images in the streaming video content based on the user input; and providing a managed version of the streaming video content, wherein the recognized specific types of sounds and images are managed in the managed version of the streaming video content, wherein the management of the recognized sounds and images is achieved through techniques selected from a group consisting of:
- volume attenuation;
- noise cancellation;
- audio synthesis;
- pitch shifting; and
- time stretching.

40. The non-transitory computer-readable medium of claim 39, wherein the user input includes a selection of specified sounds and images to be managed in the streaming video content.

41. The non-transitory computer-readable medium of claim 39, wherein the user input includes a selection of specific levels of management for the sounds and images.

42. The non-transitory computer-readable medium of claim 39, wherein the management of the recognized sounds and images includes the volume attenuation.

43. The non-transitory computer-readable medium of claim 39, wherein the management of the recognized sounds and images includes the noise cancellation.

44. The non-transitory computer-readable medium of claim 39, wherein the management of the recognized sounds and images includes the audio synthesis.

45. The non-transitory computer-readable medium of claim 39, wherein the management of the recognized sounds and images includes the pitch shifting.

46. The non-transitory computer-readable medium of claim 39, wherein the management of the recognized sounds and images includes the time stretching.

47. A non-transitory computer-readable medium storing instructions that, when executed by a one or more processors, cause the processors to perform a method for managing audio and visual content in streaming video content, the method comprising:
- receiving a user input to manage specific types of sounds and images in the streaming video content;
- recognizing the specific types of sounds and images in the streaming video content based on the user input; and
- providing a managed version of the streaming video content, wherein the recognized specific types of sounds and images are managed in the managed version of the streaming video content, wherein the user input is received through a user interface on a device selected from a group consisting of:
- a computer device;
- a mobile device;
- a smart television;
- a virtual reality device;
- an augmented reality device;
- a gaming console;
- a wearable device;
- a home automation system; and
- a vehicle infotainment system.

48. The non-transitory computer-readable medium of claim 47, wherein the device is the computer device.

49. The non-transitory computer-readable medium of claim 47, wherein the device is the mobile device.

50. The non-transitory computer-readable medium of claim 47, wherein the device is the smart television.

51. The non-transitory computer-readable medium of claim 47, wherein the device is the virtual reality device.

52. The non-transitory computer-readable medium of claim 47, wherein the device is the augmented reality device.

53. The non-transitory computer-readable medium of claim 47, wherein the device is the gaming console.

54. The non-transitory computer-readable medium of claim 47, wherein the device is the wearable device.

55. The non-transitory computer-readable medium of claim 47, wherein the device is the home automation system.

56. The non-transitory computer-readable medium of claim 47, wherein the device is the vehicle infotainment system.

57. The non-transitory computer-readable medium of claim 47, wherein providing the managed version of the streaming video content includes blurring the specific types of images.

58. The non-transitory computer-readable medium of claim 47, wherein providing the managed version of the streaming video content includes obscuring the specific types of images.

59. The non-transitory computer-readable medium of claim 47, wherein providing the managed version of the streaming video content includes replacement of the specific types of images with new visual content.

* * * * *